UNITED STATES PATENT OFFICE.

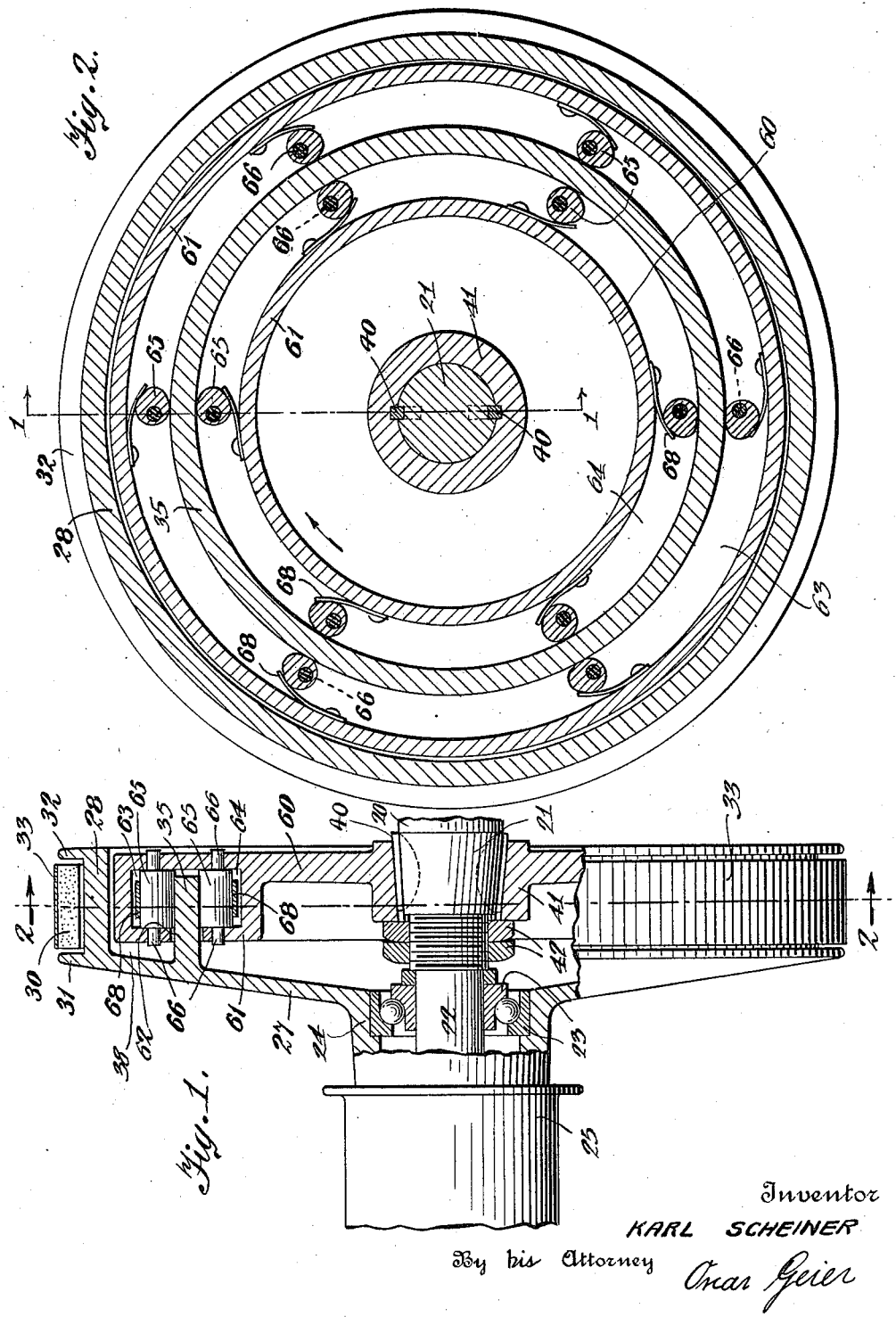

KARL SCHEINER, OF BROOKLYN, NEW YORK.

FRICTION-CLUTCH DRIVE.

1,310,967.   Specification of Letters Patent.   Patented July 22, 1919.

Original application filed November 17, 1917, Serial No. 202,654. Divided and this applicaton filed November 7, 1918. Serial No. 262,091.

*To all whom it may concern:*

Be it known that I, KARL SCHEINER, a citizen of the United States, residing at Brooklyn, county of Kings, and State of New York, have invented certain new and useful Improvements in Friction-Clutch Drives, of which the following is a specification.

This invention relates to improvements in friction clutches, such as are used for transmitting rotary motion from a rotatable driving element to a rotatable driven element.

One of the principal objects of this invention is to provide a friction clutch capable of automatic engagement whereby the driven element is rotated continuously with the driver in one direction only.

Another object is to provide a friction clutch which will permit the driven element to rotate at a higher speed than the driving element, other objects being to provide a friction clutch comprised of few and simple parts which are relatively inexpensive to manufacture, plain turning operation being only required in their construction and finish.

The purpose of the present invention is particularly to provide a clutch adapted for use in connection with the driving axle and wheels of automatically propelled vehicles, as automobiles, trucks and the like, the driving being accomplished in such manner that the outer wheel, when the vehicle is turning corners, may rotate at a higher rate of speed than the inner wheel, which, at that time is acting to propel the vehicle, this form of a clutch dispensing with differential gears and providing an independent, positive drive for each wheel from a common axle, the subject matter of the present application being disclosed in a co-pending application for rear drive for automobiles, filed November 17, 1917, Serial No. 202,654, of which this is a division.

The objects are attained by the novel construction and combination of parts hereinafter described and shown in the accompanying drawing, forming a material part of this specification, and in which:

Figure 1 is a partial side elevational and sectional view, showing a clutch made in accordance with the invention, the section being taken substantially on line 1—1 of Fig. 2, and Fig. 2 is a transverse sectional view taken on line 2—2 of Fig. 1.

In these drawings, the numeral 20 designates a fractional portion of a conventional type of axle, driven by any of the usual power transmission devices by a suitable motor connected with the vehicle.

A portion of the axle is coned, near its ends as at 21, and extending outwardly therefrom are the stems 22 upon which are engaged anti-frictional bearings 23, mounting a sleeve 24 to which may be affixed the wheel hubs 25. A circular plate 27 is formed integrally with the sleeve 24, and integral with the plate is an annular ring 28, having on its periphery a brake element 30, maintained in position by the spaced flanges 31 and 32, extending outward from the peripheral edges of the ring 28 at its side, the brake element having the usual encircling band 33 connected with the brake controlling devices of the vehicle.

Also formed integrally with the flange 27 is another annular ring 35, extending outward concentrically with the ring 28 but to a lesser distance, a space 38 being left therebetween.

Secured on the coned portion 21, of the axle 20, by keys 40 is a hub 41, held in addition by the nuts 42 in such manner that the hub is substantially rigid with the axle. Formed with this hub is a disk 60, having a thickened rim 61, the enlarged portion extending oppositely to the rings 28 and 35, the last named ring entering an annular recess 62, formed in the rim 61, the enlargement being recessed or undercut on both sides, of the recess 62, forming chambers 63 and 64. Arranged at uniformly spaced intervals within the chambers are elongated cams 65 having extending pins 66 which pass through suitable drilled openings in the rim extensions so that the cams are freely revoluble within the chambers 63 and 64.

The cam elements 65 are substantially oval in cross section, while the pins 66 are arranged eccentrically in the larger or base portion of the cams, which are so spaced and arranged as to make peripheral contact with the inner and outer surfaces of the ring 35, and are caused to impinge thereagainst by pressure of bent flat springs 68, which are secured in proximity to the pins upon the inner adjacent surfaces of the chambers 63 and 64, the construction being clearly shown in the drawing.

In operation, power being transmitted to the axle 20, the rim 61 of the disk 60 is caused to rotate, due to the rigid engagement of its hub with the axle, carrying the plurality of paired cams 65, which, due to their shape, and the pressure of the springs 68, are caused to impinge tightly upon the surfaces of the ring 35, rotating the same in an obvious manner, together with plate 27 and attached parts.

From the foregoing, it will be apparent that when the vehicle is moving in a circle, the outer wheel must necessarily move at a higher rate of speed than the inner wheel, which, at that time, is receiving transmitted power from the vehicle axle and the outer wheel, by reason of its more rapid action, forces the ring 35 between the cams, such movement being permitted, due to the frictional sliding contact so that either wheel may be used as the driver accordingly to which direction the vehicle is moving in its curved path.

It is further to be pointed out that the construction is such that all of the several main parts may be formed by plain circular turning operations, thereby eliminating the expense of milling or shaping operations and reduces the cost of manufacture correspondingly.

It may also be pointed out that wear, occurring upon the ring 35 will be substantially uniform, while the shape of the cams and the pressure of the springs provides efficient means for taking up any wear which may occur between the parts in contact.

It is to be understood that the foregoing description and drawings are to be regarded as illustrative and are subject to such modifications as practice may require regarding the specific shape of the cams, connections between the cam carrying element and the axle, etc., and in fact the entire construction limited only by the claims.

Having thus described my invention what I claim as new, and desire to secure by Letters Patent is:

1. In a power transmitting device, the combination with the driving spindle and a rotatable element revoluble thereon, of a disk fixed upon said driving spindle, a rim formed with said disk, said rim containing annular concentric recesses, pairs of opposed cams eccentrically mounted in said recesses, an annularly flanged ring extending integrally from said rotatable element, said ring being received between opposed cams and means for causing said cams to turn upon their eccentric mountings and impinge upon said ring.

2. In a power transmitting device, the combination with the driving spindle and a rotatable element revoluble thereon, of a disk fixed upon said driving spindle, a rim having an enlarged part formed with said disk, said rim containing annular concentric passages or recesses, pairs of opposed cams eccentrically mounted in said recesses, extending pins in said cams passing through the openings in said rim, an annularly flanged ring extending integrally from said rotatable element, said ring being received between opposed cams, and bent flat springs secured in proximity to the said pins upon the inner adjacent surfaces of the recesses for causing said cams to turn upon their eccentric mountings and impinge upon said ring.

In testimony whereof I have affixed my signature.

KARL SCHEINER.

Copies of this patent may be obtained for five cents each, by addressing the "Commissioner of Patents, Washington, D. C."